March 13, 1962  E. L. RALPH  3,025,335
FLEXIBLE SOLAR ENERGY CONVERTER PANEL
Filed Feb. 29, 1960

INVENTOR.
EUGENE L. RALPH
BY
ATTORNEY

United States Patent Office 3,025,335
Patented Mar. 13, 1962

3,025,335
FLEXIBLE SOLAR ENERGY CONVERTER PANEL
Eugene L. Ralph, San Gabriel, Calif., assignor to Hoffman Electronics Corporation, a corporation of California
Filed Feb. 29, 1960, Ser. No. 11,920
5 Claims. (Cl. 136—89)

The present application is a continuation-in-part of copending application Serial No. 794,137, now abandoned, entitled Flexible Solar Energy Converter Panel, filed in the name of the same inventor on February 18, 1959, and assigned to the same assignee.

The present invention relates to solar energy converter panels, and more particularly to flexible solar energy converter panels.

Solar energy converter panels currently in use comprise a plurality of solar energy converters held rigidly in place with respect to each other. Rigid panels are unsatisfactory in that they do not withstand shock well, nor can they be shaped into different forms, as for mounting on high-altitude balloons, or the like.

It is an object of the present invention, therefore, to provide a flexible solar energy converter panel.

It is another object of the present invention to provide a flexible solar energy converter panel that can withstand shock and that can be shaped into different forms.

According to the present invention, a flexible solar energy converter panel comprises a plurality of solar energy converters connected together by two flexible metal films separated by a flexible plastic insulating layer. One metal film electrically connects together the p-type conductivity region of each converter and the other metal film electrically connects together the n-type conductivity region of each converter.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which, FIGURE 1 is a plan view of a flexible solar energy converter panel embodying the present invention.

Figure 1:
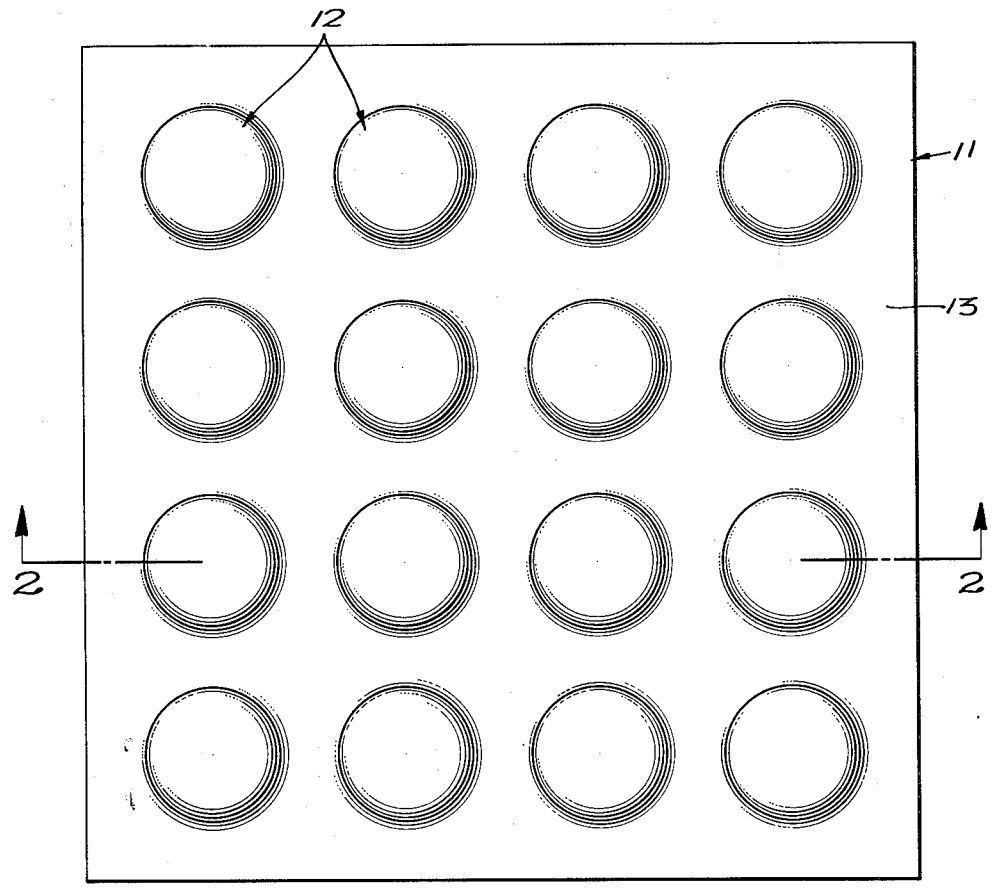
Figure 2:
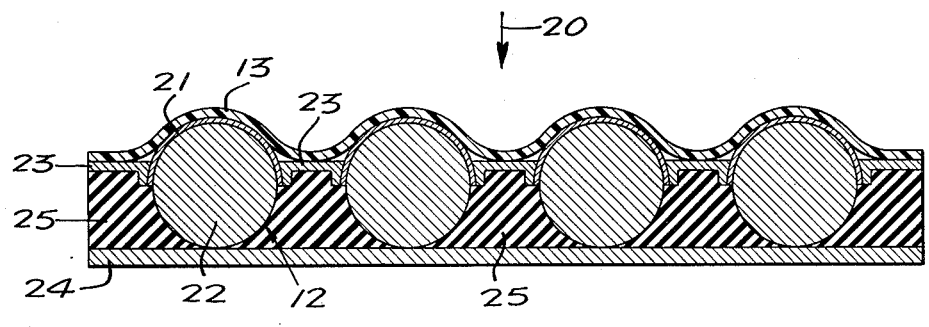

FIGURE 2 is a sectional view taken along line 2—2 of FIGURE 1.

Referring now to the drawings, FIGURE 1 shows panel 11 containing solar energy converters 12, which are arranged in a convenient pattern and are covered by transparent plastic layer 13.

FIGURE 2 shows solar energy converters 12, which, by way of example, are shown to be spherical, positioned so as to be able to receive solar energy coming from above, as indicated by arrow 20. Solar energy converter 12 comprises p-type silicon region 21 and n-type silicon region 22. Metal film 23, which is made thin so as to be flexible, connects the p-type silicon region 21 of each solar energy converter together electrically, and metal film 24, which is also made thin so as to be flexible, connects the n-type silicon region 22 of each solar energy converter together electrically. The metal films are separated by flexible plastic insulating layer 25, which may be made of silicone rubber sold under the trademark "Silastic" by Dow-Corning Corporation. Plastic layer 13, which is made of polyethylene so as to be flexible and transparent, is shown covering all the solar energy converters, and is provided to protect the converters against dirt and corrosion and to support the converters and film 23 during the process of making the panel. A method of making panel 11 will now be described.

The n-type semiconductor pieces can be obtained by mechanically grinding silicon semiconductor material into fine particles or pieces having dimensions in the order of 2 millimeters. The pieces are then diffused with boron to form a p-type region about the entire surface of each piece, resulting in a plurality of silicon energy converters. The converters are lead out in the shape of the desired panel upon a hot plate and heated. Plastic layer 13 is placed upon the hot converters and the heat causes the converters to be imbedded into layer 13, which softens and assumes the bumpy shape of the converters. When layer 13 cools, it adheres to the converters. The apparatus is then dipped into a stannous chloride solution to sensitize the surfaces, and is then immersed in a gold plating solution for the chemical deposition of gold upon the silicon to obtain an ohmic contact. The apparatus is then immersed in a silver nitrate solution, followed by a formaldehyde bath for the chemical reduction of the silver nitrate solution and the deposition of a continuous film of metallic silver upon the gold and the exposed inner surface of layer 13 to obtain electrical continuity between all the p-type regions. A copper film is then electrolytically deposited upon the silver to lower the resistance thereof and to complete the formation of film 23, which should be about 1 millimeter thick.

Insulating layer 25 is then applied between each converter. The ends of the converters opposite layer 13 are lapped to remove a portion of each p-type region and to expose each n-type region. A hydrofluoric-nitric acid solution is then applied to etch away the p-type region underneath insulating layer 25 in the direction towards layer 23, to prevent a short circuit from occurring. More silicone rubber is then applied until insulating layer 25 completely insulates each p–n junction. The converters are lapped again until each n-type region 22 is exposed once more. The apparatus is then dipped into stannous chloride, gold plating, silver nitrate, and formaldehyde solutions, and a copper film is electrolytically deposited, as before, to form film 24, which should be about 1 millimeter thick.

By the use of such flexible materials as polyethylene layer 13, silicone rubber layer 25, and metallic films 23 and 24, the resulting solar-energy converter panel is flexible and can be formed into convenient shapes as desired.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A method of making a flexible solar energy converter panel, comprising the steps of: partially imbedding a plurality of semiconductor pieces in a transparent, flexible non-conductive material, each piece having an outer first-type conductivity region and an inner second-type conductivity region; making an ohmic contact to each of said first-type conductivity regions; depositing a flexible metal film so as to electrically connect together all of said ohmic contacts; covering said film with a flexible insulating material so as to electrically insulate said pieces from each other; removing said outer first-type conductivity regions from the ends of said pieces opposite said transparent material, thereby exposing said inner second-type conductivity regions so as to face in generally the same direction; etching away a portion of said first-type conductivity regions underneath said insulating layer in the direction towards said transparent layer to prevent a short circuit from occurring; covering said first-conductivity type regions with said insulating material so that they are no longer exposed; making an ohmic contact to each of said second-type conductivity regions; and depositing a flexible metal film so as to electrically connect together each of said ohmic contacts associated with said second-type conductivity regions.

2. A method of making a flexible solar energy converter panel, comprising the steps of: partially imbedding a plurality of semiconductor pieces in a transparent, flexible non-conductive material, each piece having an outer first-type conductivity region and an inner second-type conductivity region; making an ohmic contact to each of said first-type conductivity regions; depositing a flexible metal film so as to electrically connect together each of said ohmic contacts; covering said film with a flexible insulating material so as to electrically insulate said pieces from each other; removing said outer first-type conductivity regions from the ends of said pieces opposite said transparent material, thereby exposing said inner second-type conductivity regions so they face in generally the same direction; making an ohmic contact to each of said second-type conductivity regions; and depositing a flexible metal film so as to electrically connect together each of said ohmic contacts associated with said second-type conductivity regions.

3. A method as defined in claim 2 in which said first-type conductivity region comprises p-type silicon, said second-type conductivity region comprises n-type silicon, said ohmic contacts comprise deposited gold, and said metal films comprise silver.

4. A method as defined in claim 3 including, in addition, the steps of depositing a flexible copper film upon each of said silver films, to reduce the electrical resistance thereof.

5. A method of making a flexible solar energy converter panel, comprising the steps of: partially imbedding a plurality of semiconductor pieces in a transparent, flexible non-conductive material, each piece having an outer first-type conductivity region and an inner second-type conductivity region; depositing a flexible metal film upon said transparent material so as to ohmically connect together each of said first-type conductivity regions; covering said film with a flexible insulating material so as to electrically insulate said pieces from each other; removing said outer first-type conductivity regions from the ends of said pieces opposite said transparent material, thereby exposing said inner second-type conductivity regions so they face in generally the same direction; and depositing a flexible metal film upon said insulating material so as to ohmically connect together each of said second-type conductivity regions.

References Cited in the file of this patent

UNITED STATES PATENTS

| | | |
|---|---|---|
| 2,428,537 | Veszi et al. | Oct. 7, 1947 |
| 2,711,464 | Anderson et al. | June 21, 1955 |
| 2,904,613 | Paradise | Sept. 15, 1959 |
| 2,962,539 | Daniel | Nov. 29, 1960 |

FOREIGN PATENTS

| | | |
|---|---|---|
| 331,022 | Switzerland | Aug. 15, 1958 |

UNITED STATES PATENT OFFICE
CERTIFICATE OF CORRECTION

Patent No. 3,025,335            March 13, 1962

Eugene L. Ralph

It is hereby certified that error appears in the above numbered patent requiring correction and that the said Letters Patent should read as corrected below.

Column 2, line 7, for "lead" read -- laid --.

Signed and sealed this 10th day of July 1962.

(SEAL)
Attest:

ERNEST W. SWIDER            DAVID L. LADD
Attesting Officer            Commissioner of Patents